(12) United States Patent
Suciu et al.

(10) Patent No.: US 8,033,094 B2
(45) Date of Patent: Oct. 11, 2011

(54) CANTILEVERED TIP TURBINE ENGINE

(75) Inventors: Gabriel L. Suciu, Glastonbury, CT (US); Gary D. Roberge, Tolland, CT (US); Brian Merry, Andover, CT (US)

(73) Assignee: United Technologies Corporation, Hartford, CT (US)

( * ) Notice: Subject to any disclaimer, the term of this patent is extended or adjusted under 35 U.S.C. 154(b) by 1177 days.

(21) Appl. No.: 11/577,595

(22) PCT Filed: Dec. 1, 2004

(86) PCT No.: PCT/US2004/039980
§ 371 (c)(1),
(2), (4) Date: Apr. 20, 2007

(87) PCT Pub. No.: WO2006/059978
PCT Pub. Date: Jun. 8, 2006

(65) Prior Publication Data
US 2008/0087023 A1  Apr. 17, 2008

(51) Int. Cl.
*F02K 3/02* (2006.01)
(52) U.S. Cl. .......................... 60/226.1; 60/796
(58) Field of Classification Search ............. 60/226.1, 60/262, 796–797, 805; 415/68; 416/124
See application file for complete search history.

(56) References Cited

U.S. PATENT DOCUMENTS

| | | |
|---|---|---|
| 1,544,318 A | 6/1925 | Hodgkinson |
| 2,221,685 A | 11/1940 | Smith |
| 2,414,410 A | 1/1947 | Griffith |
| 2,499,831 A | 3/1950 | Palmatier |
| 2,548,975 A | 4/1951 | Hawthorne |
| 2,611,241 A | 9/1952 | Schulz |
| 2,620,554 A | 12/1952 | Mochel et al. |
| 2,698,711 A | 1/1955 | Newcomb |
| 2,801,789 A | 8/1957 | Moss |
| 2,830,754 A | 4/1958 | Stalker |
| 2,874,926 A | 2/1959 | Gaubatz |
| 2,989,848 A | 6/1961 | Paiement |
| 3,009,630 A | 11/1961 | Busquet |
| 3,037,742 A | 6/1962 | Dent et al. |
| 3,042,349 A | 7/1962 | Pirtle et al. |

(Continued)

FOREIGN PATENT DOCUMENTS

DE         1301364         8/1969

(Continued)

OTHER PUBLICATIONS

PCT International Search Report and Written Opinion for International application No. PCT/US2004/039980 mailed Nov. 1, 2006.

(Continued)

*Primary Examiner* — Louis Casaregola
*Assistant Examiner* — Phutthiwat Wongwian
(74) *Attorney, Agent, or Firm* — Carlson, Gaskey & Olds, P.C.

(57) ABSTRACT

A tip turbine engine (10) according to the present invention includes an engine support structure (12) for cantilevering a load bearing shaft from an engine support plane (P). An engine support structure (12) defines the engine support plane (P), which is perpendicular to an engine centerline (A). The shaft (60) is rotationally fixed, coaxial with the engine centerline (A), and structurally supported by the engine support structure (12) such that a load borne by the shaft (60) is transferred along the engine support plane.

21 Claims, 2 Drawing Sheets

U.S. PATENT DOCUMENTS

| | | | |
|---|---|---|---|
| 3,081,597 A | | 3/1963 | Kosin et al. |
| 3,132,842 A | | 5/1964 | Tharp |
| 3,204,401 A | | 9/1965 | Serriades |
| 3,216,455 A | | 11/1965 | Cornell et al. |
| 3,253,406 A | * | 5/1966 | Grieb ........................ 60/262 |
| 3,267,667 A | | 8/1966 | Erwin |
| 3,269,120 A | | 8/1966 | Sabatiuk |
| 3,283,509 A | | 11/1966 | Nitsch |
| 3,286,461 A | | 11/1966 | Johnson |
| 3,302,397 A | | 2/1967 | Davidovic |
| 3,363,419 A | | 1/1968 | Wilde |
| 3,404,831 A | | 10/1968 | Campbell |
| 3,465,526 A | | 9/1969 | Emerick |
| 3,496,725 A | | 2/1970 | Ferri et al. |
| 3,505,819 A | | 4/1970 | Wilde |
| 3,616,616 A | | 11/1971 | Flatt |
| 3,684,857 A | | 8/1972 | Morley et al. |
| 3,703,081 A | | 11/1972 | Krebs et al. |
| 3,705,775 A | | 12/1972 | Rioux |
| 3,720,060 A | | 3/1973 | Davies et al. |
| 3,729,957 A | | 5/1973 | Petrie et al. |
| 3,735,593 A | | 5/1973 | Howell |
| 3,811,273 A | | 5/1974 | Martin |
| 3,818,695 A | | 6/1974 | Rylewski |
| 3,836,279 A | | 9/1974 | Lee |
| 3,861,822 A | | 1/1975 | Wanger |
| 3,932,813 A | | 1/1976 | Gallant |
| 3,979,087 A | | 9/1976 | Boris et al. |
| 4,005,575 A | | 2/1977 | Scott et al. |
| 4,130,379 A | | 12/1978 | Partington |
| 4,147,035 A | | 4/1979 | Moore et al. |
| 4,251,185 A | | 2/1981 | Karstensen |
| 4,251,987 A | | 2/1981 | Adamson |
| 4,265,646 A | | 5/1981 | Weinstein et al. |
| 4,271,674 A | | 6/1981 | Marshall et al. |
| 4,298,090 A | | 11/1981 | Chapman |
| 4,326,682 A | | 4/1982 | Nightingale |
| 4,452,038 A | | 6/1984 | Soligny |
| 4,463,553 A | | 8/1984 | Boudigues |
| 4,561,257 A | | 12/1985 | Kwan et al. |
| 4,563,875 A | | 1/1986 | Howald |
| 4,631,092 A | | 12/1986 | Ruckle et al. |
| 4,751,816 A | | 6/1988 | Perry |
| 4,785,625 A | | 11/1988 | Stryker et al. |
| 4,817,382 A | | 4/1989 | Rudolph et al. |
| 4,834,614 A | | 5/1989 | Davids et al. |
| 4,883,404 A | | 11/1989 | Sherman |
| 4,887,424 A | | 12/1989 | Geidel et al. |
| 4,904,160 A | | 2/1990 | Partington |
| 4,912,927 A | | 4/1990 | Billington |
| 4,965,994 A | | 10/1990 | Ciokajlo et al. |
| 4,999,994 A | | 3/1991 | Rud et al. |
| 5,010,729 A | | 4/1991 | Adamson et al. |
| 5,012,640 A | | 5/1991 | Mirville |
| 5,014,508 A | | 5/1991 | Lifka |
| 5,088,742 A | | 2/1992 | Catlow |
| 5,107,676 A | | 4/1992 | Hadaway et al. |
| 5,157,915 A | | 10/1992 | Bart |
| 5,182,906 A | | 2/1993 | Gilchrist et al. |
| 5,224,339 A | | 7/1993 | Hayes |
| 5,232,333 A | | 8/1993 | Girault |
| 5,267,397 A | | 12/1993 | Wilcox |
| 5,269,139 A | | 12/1993 | Klees |
| 5,275,536 A | | 1/1994 | Stephens et al. |
| 5,315,821 A | | 5/1994 | Dunbar et al. |
| 5,328,324 A | | 7/1994 | Dodd |
| 5,443,590 A | | 8/1995 | Ciokajlo et al. |
| 5,452,575 A | * | 9/1995 | Freid ........................ 60/797 |
| 5,466,198 A | | 11/1995 | McKibbin et al. |
| 5,497,961 A | | 3/1996 | Newton |
| 5,501,575 A | | 3/1996 | Eldredge et al. |
| 5,537,814 A | | 7/1996 | Nastuk et al. |
| 5,584,660 A | | 12/1996 | Carter et al. |
| 5,628,621 A | | 5/1997 | Toborg |
| 5,630,890 A | * | 5/1997 | Smashey et al. ............ 148/669 |
| 5,746,391 A | | 5/1998 | Rodgers et al. |
| 5,769,317 A | | 6/1998 | Sokhey et al. |
| 5,860,275 A | * | 1/1999 | Newton et al. ............ 60/226.1 |
| 6,004,095 A | | 12/1999 | Waitz et al. |
| 6,095,750 A | | 8/2000 | Ross et al. |
| 6,102,361 A | | 8/2000 | Riikonen |
| 6,158,207 A | | 12/2000 | Polenick et al. |
| 6,223,616 B1 | | 5/2001 | Sheridan |
| 6,244,539 B1 | | 6/2001 | Lifson et al. |
| 6,364,805 B1 | | 4/2002 | Stegherr |
| 6,381,948 B1 | | 5/2002 | Klingels |
| 6,382,915 B1 | | 5/2002 | Aschermann et al. |
| 6,384,494 B1 | | 5/2002 | Avidano et al. |
| 6,430,917 B1 | | 8/2002 | Platts |
| 6,454,535 B1 | | 9/2002 | Goshom et al. |
| 6,471,474 B1 | | 10/2002 | Mielke et al. |
| RE37,900 E | | 11/2002 | Partington |
| 6,513,334 B2 | | 2/2003 | Varney |
| 6,619,030 B1 | | 9/2003 | Seda et al. |
| 6,851,264 B2 | | 2/2005 | Kirtley et al. |
| 6,883,303 B1 | | 4/2005 | Seda |
| 6,910,854 B2 | | 6/2005 | Joslin |
| 7,021,042 B2 | | 4/2006 | Law |
| 7,214,157 B2 | | 5/2007 | Flamang et al. |
| 2002/0190139 A1 | | 12/2002 | Morrison |
| 2003/0031556 A1 | | 2/2003 | Mulcaire et al. |
| 2003/0131602 A1 | | 7/2003 | Ingistov |
| 2003/0131607 A1 | | 7/2003 | Daggett |
| 2003/0192304 A1 | | 10/2003 | Paul |
| 2004/0025490 A1 | | 2/2004 | Paul |
| 2004/0070211 A1 | | 4/2004 | Franchet et al. |
| 2004/0189108 A1 | | 9/2004 | Dooley |
| 2004/0219024 A1 | | 11/2004 | Soupizon et al. |
| 2005/0008476 A1 | | 1/2005 | Eleftheriou |
| 2005/0127905 A1 | | 6/2005 | Proctor et al. |

FOREIGN PATENT DOCUMENTS

| | | |
|---|---|---|
| EP | 1340902 A2 | 9/2003 |
| FR | 2274788 | 1/1976 |
| GB | 905136 | 9/1962 |
| GB | 1287223 | 8/1972 |
| GB | 1503394 | 3/1978 |
| GB | 2026102 | 1/1980 |
| JP | 10184305 | 7/1998 |
| WO | 02081883 | 10/2002 |
| WO | 02081883 A2 | 10/2002 |
| WO | 2004011788 | 2/2004 |
| WO | 2004011788 A1 | 2/2004 |
| WO | 2004092567 | 10/2004 |
| WO | 2004092567 A2 | 10/2004 |
| WO | 2006059978 | 6/2006 |
| WO | 2006059988 | 6/2006 |
| WO | 2006059989 | 6/2006 |
| WO | 2006060006 | 6/2006 |
| WO | 2006062497 | 6/2006 |
| WO | 2006059971 | 8/2006 |
| WO | 2006059979 | 6/2007 |

OTHER PUBLICATIONS

PCT International Preliminary Report on Patentability for International application No. PCT/US2004/039980 mailed Sep. 3, 2007.

* cited by examiner

US 8,033,094 B2

CANTILEVERED TIP TURBINE ENGINE

BACKGROUND OF THE INVENTION

The present invention relates to a tip turbine engine, and more particularly to an assembly with a load bearing support shaft cantilevered from a single engine support plane.

An aircraft gas turbine engine of the conventional turbofan type generally includes a forward bypass fan and a low pressure compressor, a middle core engine including a combustor, and an aft low pressure turbine all located along a common longitudinal axis. Although highly efficient, conventional turbofan engines operate in a axial flow relationship. The serial flow relationship results in a relatively complicated elongated engine structure and, therefore, requires multiple mounting planes to mount the engine and bear the loads of the elongated structure. Utilizing multiple mounting planes may complicate the mounting process and make assembly laborious and expensive.

A recent development in gas turbine engines is the more longitudinally compact tip turbine engine. Tip turbine engines locate an axial compressor forward of a bypass fan, which includes hollow fan blades that receive airflow from the axial compressor therethrough such that the hollow fan blades operate as a centrifugal compressor. Compressed core airflow from the hollow fan blades is mixed with fuel in an annular combustor located radially outward from the fan. The combustor ignites the fuel mixture to form a high energy gas stream which drives turbine blades that are integrated onto the tips of the hollow bypass fan blades for rotation therewith as disclosed in U.S. Patent Application Publication Nos.: 2003192303; 20030192304; and 20040025490. The tip turbine engine provides a thrust to weight ratio equivalent to conventional turbofan engines of the same class within a package of significantly shorter longitudinal length.

Accordingly and because of the unique architecture and shorter length of the tip turbine engine, it is desirable to cantilever the length of the engine from a sole engine support plane.

SUMMARY OF THE INVENTION

The tip turbine engine according to the present invention provides an engine support structure for mounting and supporting the engine. The engine support structure includes an outer case that supports exit guide vanes, a static outer support housing, a gearbox housing, and a static inner support shaft. The exit guide vanes bear radial loads and define an engine support plane that is perpendicular to an engine centerline. The static inner support shaft is coaxial with the engine centerline and is cantilevered relative to the engine support plane such that loads borne by the static inner support shaft are transferred to the engine support plane. The static inner support shaft supports a compressor rotor with compressor blades that rotate about the engine centerline.

The present invention therefore provides a tip turbine engine assembly that is structurally supported from a single engine support plane.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
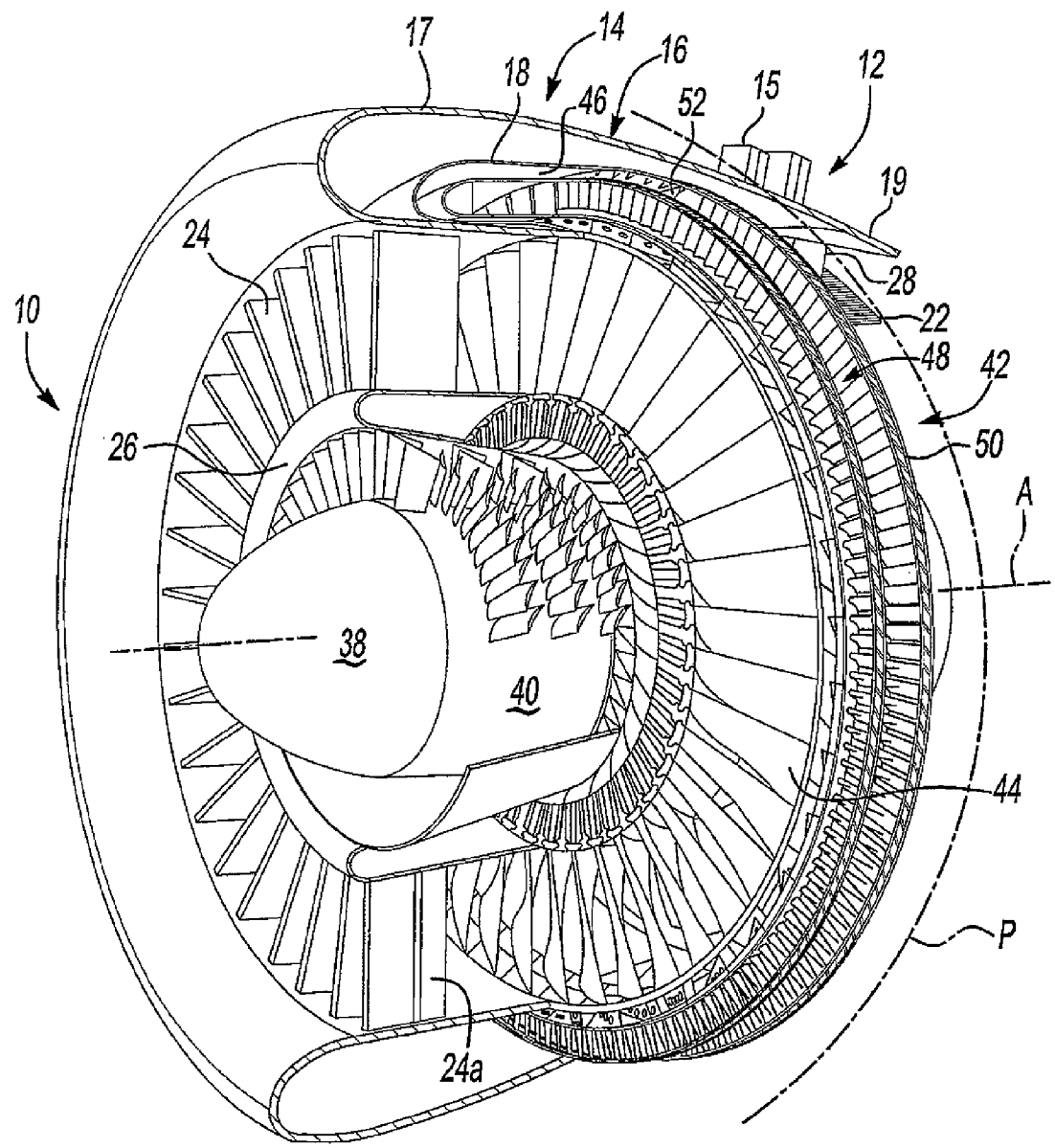
FIG. 1 is a partial sectional perspective view an exemplary tip turbine engine assembly of the present invention.

FIG. 1 illustrates a partial sectional perspective view of a tip turbine engine (TTE) type gas turbine engine 10. The engine 10 includes a load bearing engine support structure 12. The engine support structure 12 includes an outer structural case 14 with engine mounts 15 located about the periphery. The outer structural case 14 includes a nacelle 16, forward case portion 17, a structural portion 18, and an exhaust case portion 19 that includes an exhaust mixer 22. A multiple of fan inlet guide vanes 24 are mounted between the outer structural case 14 and a static inner support member 26. Each inlet guide vane 24 preferably includes a variable trailing edge 24A. A multiple of exit guide vanes 28 extend radially inward from the exhaust case portion 19.

A nosecone 38 is preferably located along the engine centerline A to improve airflow into an axial compressor 40. The axial compressor 40 is mounted about the engine centerline A behind the nosecone 38.

A fan-turbine rotor assembly 42 is mounted for rotation about the engine centerline A aft of the axial compressor 40. The fan-turbine rotor assembly 42 includes a multiple of hollow fan blades 44 to provide internal, centrifugal compression of the compressed airflow from the axial compressor 40 for distribution to an annular combustor 46, located within the outer structural case 14.

A turbine 48 includes a multiple of tip turbine blades 50 (two stages shown) which rotatably drive the hollow fan blades 44 relative to a multiple of tip turbine stators 52 which extend radially inward from the outer structural case 14. The annular combustor 46 is axially forward of the turbine 48 and communicates with the turbine 48.

Figure 2:
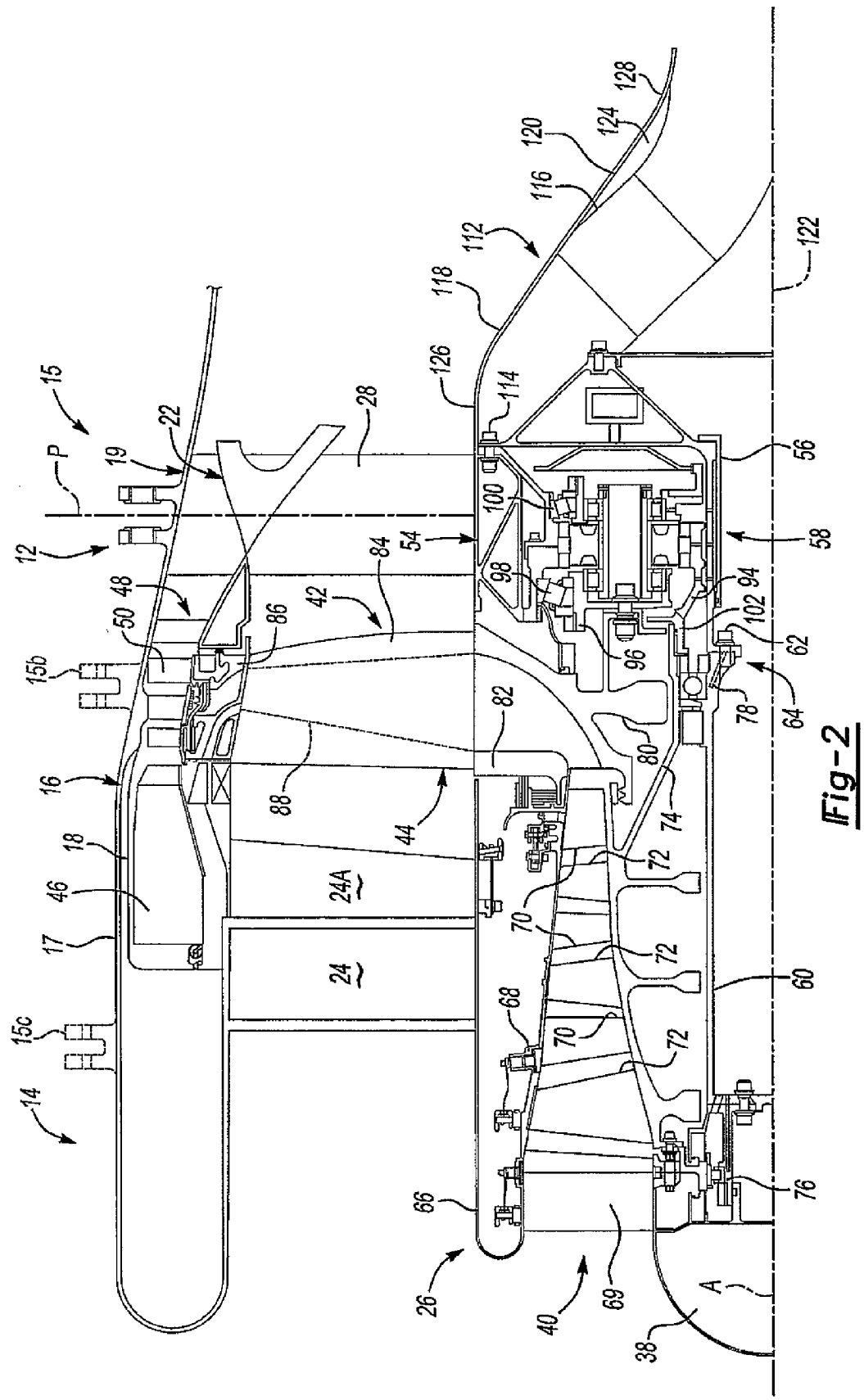
FIG. 2 is a cross-sectional view of the tip turbine engine of FIG. 1.

Referring to FIG. 2, the outer structural case 14 includes engine mounts 15 on the periphery of the outer structural case 14 that are preferably located aft of the fan-turbine rotor assembly 42 and coplanar with an engine support plane P. The exit guide vanes 28 define the engine support plane P by virtue of providing radial structural support relative to the engine centerline A. Alternatively, the engine mounts 15 may be located coplanar with the fan-turbine rotor assembly 42 or forward of the fan-turbine rotor assembly 42, as illustrated by the phantom engine mounts 15B and 15C, respectively.

The engine mounts 15 are mounted on the exhaust case portion 19 of the outer structural case 14, which is structurally attached to the exit guide vanes 28. The exit guide vanes 28 are preferably integrally formed with the exhaust case portion 19, however, the exit guide vanes 28 may alternatively be attached with a fastener, by welding, or by other method of attachment.

The exit guide vanes 28 are structurally attached to a static support housing 54. Preferably, the exit guide vanes 28 are attached to the static support housing 54 by welding, however, other methods of attachment, such as by fastener, may be utilized.

The static support housing 54 forms part of a gearbox housing 56, which houses a gearbox assembly 58. The gearbox housing 56 is structurally attached to a static inner support shaft 60 with a fastener 62 at a flange joint 64. The static inner support shaft 60 is therefore cantilevered from the engine support plane P. That is, a load borne by the static inner support shaft 60 which is generally parallel with the engine centerline A, is transferred to the outer structural case 14 through the exit guide vanes 28 in the perpendicular engine support plane P. The engine support plane P is the sole support plane of the engine 10 because it is the only radial plane along which a load on the static inner support shaft can be transferred to the outer structural case 14.

The axial compressor 40 includes a compressor case 68. A splitter 66 extends from the compressor case 68 and attaches to the inlet guide vanes 24. The compressor case 68 is spaced radially outward relative to the engine centerline A from the static inner support shaft 60 and is coaxial with the static inner support shaft 60. The compressor case 68 is fixedly mounted to a support member 69 that extends radially outward from the static inner support shaft 60. The static inner support shaft 60 structurally supports the compressor case 68. That is, the static inner support shaft 60 transfers the load of the compressor case 68 through the engine 10, to the outer structural case 14 via the engine support plane P.

A plurality of compressor vanes 70 extend radially inwardly from the compressor case 68 between stages of compressor blades 72, which are mounted on an axial compressor rotor 74. The compressor blades 72 and compressor vanes 70 are arranged circumferentially about the axial compressor rotor 74 in stages (three stages of compressor blades 72 and compressor vanes 70 are shown in this example). The axial compressor rotor 74 is mounted for rotation upon the static inner support shaft 60 through a forward bearing assembly 76 and an aft bearing assembly 78.

The fan-turbine rotor assembly 42 includes a fan hub 80 that supports a multiple of the hollow fan blades 44. Each hollow fan blade 44 includes an inducer section 82, a hollow fan blade section 84 and a diffuser section 86. The inducer section 82 receives airflow from the axial compressor 40 generally parallel to the engine centerline A and turns the airflow from an axial airflow direction toward a radial airflow direction. The airflow is radially communicated through a core airflow passage 88 within the fan blade section 84 where the airflow is centrifugally compressed. From the core airflow passage 88, the diffuser section 86 turns the airflow toward an axial airflow direction toward the annular combustor 46. Preferably the airflow is diffused axially forward in the engine 10, however, the airflow may alternatively be communicated in another direction depending on the location of the annular combustor 46 in the engine 10.

The gearbox assembly 58 aft of the fan-turbine rotor assembly 42 provides a speed increase between the fan-turbine rotor assembly 42 and the axial compressor 40. The gearbox assembly 58 includes a sun gear shaft 94 which rotates with the axial compressor 40 and a planet carrier 96 which rotates with the fan-turbine rotor assembly 42 to provide a speed differential there between. The gearbox assembly 58 is preferably a planetary gearbox that provides co-rotating or counter-rotating rotational engagement between the fan-turbine rotor assembly 42 and an axial compressor rotor 74. The gearbox assembly 58 is mounted for rotation between the sun gear shaft 94 and the static support housing 54 through a forward bearing 98 and a rear bearing 100. The forward bearing 98 and the rear bearing 100 are both tapered roller bearings and both handle radial loads. The forward bearing 98 handles the aft axial load, while the rear bearing 100 handles the forward axial loads.

The sun gear shaft 94 is rotationally engaged with the axial compressor rotor 74 at a splined interconnection 102 or the like. Alternatively, the gearbox assembly 58 could provide a speed decrease between the fan-turbine rotor assembly 42 and the axial compressor rotor 74.

A tailcone assembly 112 is mounted on the static support housing 54 with a set of fasteners 114, although only one fastener is illustrated in the FIG. 2. The tailcone assembly 112 houses a device 116, such as an oil cooler or other device, and includes a frustoconical surface 118. A wall structure 120 disposed about central axis 122 forms the frustoconical surface 118. The wall structure 120 defines an interior compartment 124 and a forward portion 126 that tapers to an aft portion 128 of the tailcone assembly 112.

In operation, air enters the axial compressor 40, where it is compressed by the three stages of the compressor blades 72 and compressor vanes 70. The compressed air from the axial compressor 40 enters the inducer section 82 in a direction generally parallel to the engine centerline A and is turned by the inducer section 82 radially outwardly through the core airflow passage 88 of the hollow fan blades 44. The airflow is further compressed centrifugally in the hollow fan blades 44 by rotation of the hollow fan blades 44. From the core airflow passage 88, the diffuser section 86 turns the airflow axially forward in the engine 10 into the annular combustor 46. The compressed core airflow from the hollow fan blades 44 is mixed with fuel in the annular combustor 46 and ignited to form a high-energy gas stream. The high-energy gas stream is expanded over the multiple of tip turbine blades 50 mounted about the outer periphery of the fan-turbine rotor assembly 42 to drive the fan-turbine rotor assembly 42, which in turn drives the axial compressor 40 through the gearbox assembly 58.

Concurrent therewith, the fan-turbine rotor assembly 42 discharges fan bypass air axially aft and the exhaust mixer 22 merges bypass air with the high energy gas stream in the exhaust case portion 19. The exit guide vanes 28 located between the static support housing 54 and the outer structural case 14 guide the combined airflow out of the engine 10 to provide forward thrust.

It should be understood that relative positional terms such as "forward," "aft," "upper," "lower," "above," "below," and the like are with reference to the normal operational attitude of the vehicle and should not be considered otherwise limiting.

It should be understood that although a particular component arrangement is disclosed in the illustrated embodiment, other arrangements will benefit from the instant invention.

Although particular step sequences are shown, described, and claimed, it should be understood that steps may be performed in any order, separated or combined unless otherwise indicated and will still benefit from the present invention.

Although a preferred embodiment of this invention has been disclosed, a worker of ordinary skill in this art would recognize that certain modifications would come within the scope of this invention. For that reason, the following claims should be studied to determine the true scope and content of this invention.

The invention claimed is:

1. A tip turbine engine assembly comprising:
an axial compressor having a plurality of compressor blades;
a fan downstream of the axial compressor;
an engine support plane defined by an engine support structure;
an engine centerline axis essentially perpendicular to said support plane; and
a fixed shaft coaxial with said engine centerline axis, the fixed shaft having a forward end aft of the plurality compressor blades, said fixed shaft being non-moveable during operation, wherein said fixed shaft is cantilevered from said engine support plane by the engine support structure.

2. The assembly as recited in claim 1, wherein said engine support plane is the sole engine support plane of the tip turbine engine assembly.

3. The assembly as recited in claim 1, further comprising a fan having a fan blade defining a core airflow passage therethrough, wherein said engine support plane is aft of said fan.

4. The assembly as recited in claim 1, further comprising a rotor coaxial with said fixed shaft.

5. The assembly as recited in claim 4, wherein said rotor comprises an axial compressor rotor that rotates about said fixed shaft.

6. The assembly as recited in claim 1, wherein the engine support structure is a plurality of guide vanes that extend radially relative to said engine centerline define said engine support plane.

7. The assembly of claim 1, further comprising an axial compressor and a bypass fan coaxially mounted about the engine centerline axis, wherein the bypass fan is aft of the axial compressor.

8. The assembly of claim 7, wherein the bypass fan includes hollow fan blades.

9. A tip turbine engine assembly comprising:
an engine centerline;
a fan rotatable by a gear assembly about said engine centerline, said fan comprising a fan blade defining a core airflow passage therein;
an engine support structure disposed about said engine centerline defining an engine support plane substantially perpendicular to said engine centerline; and
a shaft coaxial with said engine centerline and fixed to said engine support structure such that the shaft is non-moveable during operation of the engine, wherein said shaft is cantilevered from said engine support plane.

10. The assembly as recited in claim 9, wherein said engine support plane is the sole engine support plane of the assembly.

11. The assembly as recited in claim 9, wherein said shaft is fixed.

12. The assembly as recited in claim 9, wherein said engine support structure comprises an engine outer case with a guide vane portion extending radially inward from said engine outer case, said guide vane portion structurally supporting said shaft.

13. The assembly of claim 12, wherein the guide vane portion is formed integrally with the engine outer case.

14. The assembly as recited in claim 9, wherein said engine support structure comprises a plurality of engine mounts attached on a periphery of an outer case in said engine support plane.

15. The assembly as recited in claim 9, wherein said shaft supports a rotor rotatable about said engine centerline.

16. The assembly as recited in claim 15, further comprising a bearing between said shaft and said rotor.

17. A tip turbine engine assembly comprising:
an engine centerline;
an engine outer case structure disposed about said engine centerline;
a guide vane portion that extends radially inward from said engine outer case structure;
a gearbox housing fixed to said guide vane portion, the gearbox housing enclosing a gear assembly that rotates with an axial compressor; and
a shaft coaxial with said engine centerline and fixed to said gearbox housing such that the shaft is non-moveable during operation, wherein said shaft is cantilevered from said gearbox.

18. The assembly as recited in claim 17, wherein said engine outer case structure comprises a plurality of engine mounts defining an engine support plane.

19. The assembly of claim 18, further comprising a fan turbine rotor assembly about the engine centerline axis, wherein the plurality of engine mounts are axially aft of the fan turbine rotor assembly.

20. The assembly as recited in claim 17, further comprising a rotor supported by said shaft.

21. The assembly as recited in claim 20, further comprising a bearing between said rotor and said shaft.

\* \* \* \* \*